June 19, 1951  A. SOMA  2,557,577

FISHING LURE

Filed Sept. 9, 1949

Andrew Soma
INVENTOR.

BY *Clarence A. O'Brien*
*and Harvey B. Jacobson*
Attorneys

Patented June 19, 1951

2,557,577

UNITED STATES PATENT OFFICE 2,557,577

FISHING LURE

Andrew Soma, Winthrop Harbor, Ill.

Application September 9, 1949, Serial No. 114,831

1 Claim. (Cl. 43—41)

The present invention relates to new and useful improvements in fish lures and more particularly to a transparent live bait holder and protector to prevent injury to the bait when struck by a fish.

An important object of the invention is to provide a transparent tube for holding a live bait in a captive position and safe from injury while casting or trolling and providing novel means for attaching a fish line to the holder as well as to a fish hook carried thereby to relieve the tube of the weight and strain of a fish striking the line.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
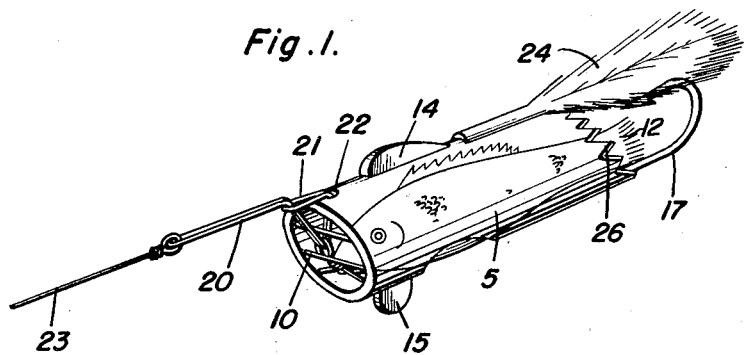
Figure 1 is a perspective view.
Figure 2:
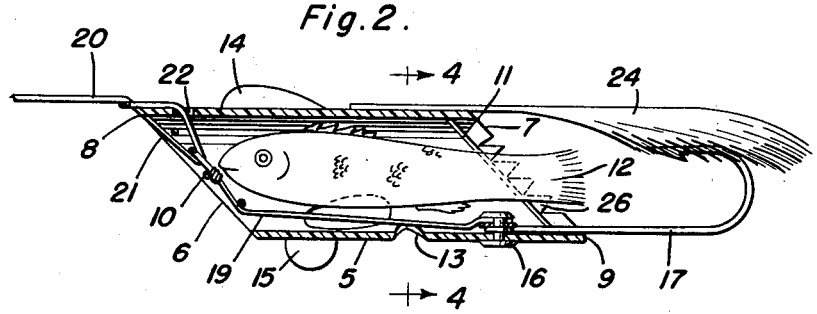
Figure 2 is a longitudinal sectional view.
Figure 3:
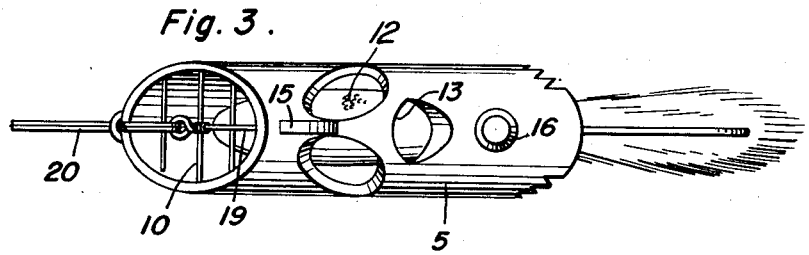
Figure 3 is a bottom plan view.
Figure 4:
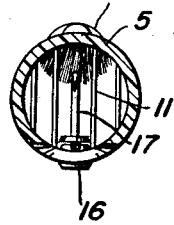
Figure 4 is a transverse sectional view taken on a line 4—4 of Figure 2 with the bait eliminated.

Referring now to the drawing in detail, wherein for the purpose of illustration I have disclosed a preferred embodiment of my invention, the numeral 5 designates a tubular body of suitable transparent material and having its front and rear ends 6 and 7 open and biased in planes parallel to each other to provide an overhanging upper front end 8 and an underlying lower rear end 9.

The front end 6 is closed by transverse bars 10 and the rear end is closed by vertical bars 11 having their ends molded or otherwise suitably anchored in the body 5 to form a cage or protective holder for a live bait 12 which is placed in the holder through an opening 13 of suitable size in the bottom of the holder.

A longitudinal extending cork or other suitable buoyant fin 14 is cemented on top of the body 5 and a weighted keel 15 is similarly secured to the bottom of the body at its forward portion.

A rivet 16 is secured to the rear bottom portion of body 5 and to which a fish hook 17 is attached in a position to hold the bill 18 of the hook upright and projecting rearwardly from the body. A rear leader 19 is also attached to the rivet 16 and extends forwardly in an interlaced position with front bars 10. A front leader 20 is provided with a loop 21 connected to rear leader 19 and also engages the uppermost bar 10 as well as an opening 22 in the overhanging upper front end 8 of the body to thus distribute the pulling force to the rivet 16, bars 10 and upper front end 8 of the body. The weight and strain of a fish striking hook 17 is also subjected directly to the leaders 19 and 20 to which a fish line 23 is attached.

Hair or feather lures 24 are secured to the upper rear portion of body 5 to trail rearwardly over bill 18 of the hook in a concealing position.

Additional openings 25 are also formed in the bottom of the body to facilitate discharge of water entering the front end of the body to reduce pressure therein and to aid in the quick surfacing of the body when rapidly reeled in.

The rear end of body 5 is formed with teeth 26 to aid in holding a fish on hook 17 after being caught and to prevent disgouging of the hook.

In the use of the invention a live bait 12 is forced into body 5 through opening 13, the body holding the bait in a longitudinal position in the body with little danger of escaping through the opening. Bars 10 and 11 prevent escape of the bait from the front and rear ends of the body.

Cork fin 14 and keel 15 aid in keeping the body from turning over in the water and the pulling force of the fish line applied to the overhanging upper front end 8 also keeps the body in a desired balanced position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fish lure comprising a transparent tubular body for containing a live bait, said body having an inclined front end and a top opening adjacent said front end, cross rods in said front end forming a reticulated closure therefor, a fastener in the bottom of said body adjacent its rear end and inside said body and having a hook extending therefrom out of said rear end, a leader secured to said fastener and laced through said bars with a terminal front end loop, a second leader having an end loop passed through said opening and through the first named loop and around one of said bars, and a line attached to the second named leader.

ANDREW SOMA.

REFERENCES CITED

The following references are of record in the file of this patent:

UNITED STATES PATENTS

| Number | Name | Date |
|---|---|---|
| 556,494 | Dales | Mar. 17, 1896 |
| 993,374 | Holmgreen | May 30, 1911 |
| 1,003,962 | Henning | Sept. 19, 1911 |
| 1,611,644 | Johnson | Dec. 21, 1926 |
| 1,870,273 | Willinger | Aug. 9, 1932 |
| 2,152,275 | Parkins | Mar. 28, 1939 |
| 2,196,508 | Steinhoff | Apr. 9, 1940 |
| 2,235,600 | Ammerman | Mar. 18, 1941 |
| 2,246,413 | Haselwood | June 17, 1941 |
| 2,467,971 | Frair | Apr. 19, 1949 |